United States Patent [19]
Rose

[11] Patent Number: 5,930,769
[45] Date of Patent: Jul. 27, 1999

[54] SYSTEM AND METHOD FOR FASHION SHOPPING

[76] Inventor: Andrea Rose, 245 E. 63rd St., Apt. 319, New York, N.Y. 10021

[21] Appl. No.: 08/726,674

[22] Filed: Oct. 7, 1996

[51] Int. Cl.[6] .................................................. G06F 17/60
[52] U.S. Cl. ........................... 705/27; 345/419; 364/400; 705/26; 707/104
[58] Field of Search ............................ 345/419; 364/400, 364/470.02, 470.03; 705/26, 27; 707/104

[56] References Cited

U.S. PATENT DOCUMENTS

| | | | |
|---|---|---|---|
| 4,149,246 | 4/1979 | Goldman | 364/470.03 |
| 4,261,012 | 4/1981 | Maloomian | 358/93 |
| 4,546,434 | 10/1985 | Gioello | 364/400 |
| 4,626,344 | 12/1986 | Collins et al. | 364/470.03 |
| 4,916,624 | 4/1990 | Collins et al. | 364/470.03 |
| 4,916,634 | 4/1990 | Collins et al. | 395/10 |
| 5,163,006 | 11/1992 | Deziel | 364/470.03 |
| 5,163,007 | 11/1992 | Slilaty | 364/470.03 |
| 5,495,568 | 2/1996 | Beavin | 364/188 |
| 5,551,021 | 8/1996 | Harada et al. | 707/104 |
| 5,680,314 | 10/1997 | Patterson et al. | 364/470.03 |

OTHER PUBLICATIONS

Sizing Up Clothing Sizes, Know How Magazine, Spring, 1994.

*Primary Examiner*—Edward R. Cosimano

[57] ABSTRACT

The present invention provides a method of manual fashion shopping and method for electronic fashion shopping by a customer using a programmed computer, CD-ROM, television, Internet or other electronic medium such as video. The method comprises receiving personal information from the customer; selecting a body type and fashion category based on the personal information; selecting fashions from a plurality of clothes items based on the body type and fashion category; outputting a plurality of fashion data based on the selected fashions; and receiving selection information from the customer.

45 Claims, 6 Drawing Sheets

Welcome to The Fashion Reflection Profile

Which of the following areas would you like to shop?

PRESS TO SELECT YOUR CHOICE

- Day Suits (14)
- Evening Suits (16)
- Day Dresses (18)
- Coats (20)
- Active Sports (22)
- SportsWear (24)
- At Homewear (26)

Figure 2

The Fashion Reflection Profile

Size and Fit Information

The closest size to your measurements is  6

The arrows indicate where adjustments might be necessary

1/2" less in Bust

1/2" less in Hip

Manufacturer: Ellen Tracy
Price: Jacket $425.00
       Skirt   $165.00
Description: Empire jacket in black wool crepe and velvet Bust 48
Hips See Another Suit (40)

ORDER (42)

START AGAIN (44)

Your Fashion Profile

Your unique body type is _____
                        variable

Suggested fashion information for your unique body type. Since you are a _____.
                    variable Suggested information including such categories as fashion shapes, styles, accessories, fabrics and fabric prints, colors etc.

Please call 1-800-000-0000 the system would like more information about you to assist you. (Variable Option to Call In)

Suggested Fashion Shapes For Your unique body type are described as follows: 50

(Here a variety of fashion shapes and styles are presented)

      

Description        Description        Description
_____    _____    _____
_____    _____    _____

Suggested fashion shapes to avoid wearing are described as follows: 52

(Here a variety of fashion shapes and Styles are given)

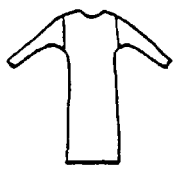      

Description        Description        Description
_____    _____    _____
_____    _____    _____

Your Selection Indicator

Would you like to use the Fit Profile?   Yes  No
(Example of Choices)                      ☐    ☐

Please select one of the following services

Yes  No
Fashion
Reflection

Do you want           ☐   ☐
to try this
style on?

Fit Profile

Do you want           ☐   ☐
to see fit
information?

Order

Do you want           ☐   ☐
to place an
order?

Mall Collection

Do you want           ☐   ☐
to see what
categories are
available in the
mall?

Shop

Do you want           ☐   ☐
to see
another style?

Finish

Do you want           ☐   ☐
to END the
program?

(Here a variety of services are offered)

Figure 5

SYSTEM AND METHOD FOR FASHION SHOPPING

FIELD OF THE INVENTION

The present invention relates to a method of fashion shopping by a customer and more particularly to a method which helps select an appropriate fashion for purchase based on data relating to the customer.

BACKGROUND OF THE INVENTION

One of the biggest problems facing the retail clothing industry is the return of merchandise due to improper fit. Fit is cited as an important problem since customers often do not know their size in a particular manufacturer's clothing line. Escalating the problem, most manufacturers have developed their own systems for sizing. Regarding sales made in department stores, boutiques, or other stores, customers often try on three or four different sizes from a given manufacturer's clothing line to determine which size fits their body properly. This is both time consuming and frustrating. For the mail order catalogs and home shopping industry on television, returns are one of the biggest drawbacks of selling fashions. This is because the customers do not have the opportunity to try on garments before purchasing and must guess which size they would be in a given manufacturer's clothing line. Often, when the customers receive the garment through the mail, the garments do not fit properly and must be returned. Similar problems occur when a customer uses her computer to shop via the Internet or to shop using a CD-ROM database containing an inventory of merchandise. Thus, a need exists for a system or method to reduce the number of returns due to improper fit of the merchandise and lessen the amount of time trying on merchandise during in-store shopping.

Another drawback for in-store shopping is the large amount of inventory which must be made available. Today, customers lead very busy lives and often do not have the time to sift through all of the merchandise. Thus, a need exists for a method of allowing customers to see merchandise quickly and efficiently.

A further drawback for in-store shopping pertains to tracking inventory. Sales people often are not aware of which merchandise has been back-ordered or which merchandise is instock. Sales people tell the customer to look on the floor to see if an item in the customer's size is available. Thus, there exists a need to track inventory and order inventory if merchandise is purchased which is not in stock.

SUMMARY AND OBJECTS OF THE INVENTION

Accordingly, the present invention provides a method for electronic fashion shopping by a customer using a programmed computer, CD-ROM database, interactive television, Internet, or other electronic medium such as video or alternatively, a manual system. To attain this, the method comprises receiving personal information from the customer; selecting a body type and fashion category based on the personal information; selecting fashions from a plurality of clothes items based on the body type and fashion category; outputting a plurality of fashion data based on the selected fashions; and receiving selection information from the customer.

Accordingly, it is an object of the present invention to provide a method of electronic fashion shopping and manual shopping as a marketing and sales tool for retailers and manufacturers to provide enhanced services and easy shopping for customers while increasing efficiency.

Another object of the present invention is to provide a method of electronic shopping and manual shopping which allows customers to see merchandise quickly, easily, conveniently, and facilitates opportunities for customers to buy merchandise and try on the clothes by seeing a simulated body type matching her own body type and having her own face.

Still another object of the present invention is to provide a method of electronic shopping and manual shopping which gives retailers and manufacturers the opportunity to make multiple sales, build customer loyalty and provide outstanding personal service.

Yet another object of the present invention is to furnish a method of electronic shopping and manual shopping that provides easy inventory control and reduces returns due to improper fit of the merchandise.

A further object of the present invention is to provide a method of electronic shopping and manual shopping which reduces the amount of time expended shopping.

Another object of the present invention is to provide a dynamic personalized system that helps women, men, and children save time, money, and countless hours of frustration by teaching them about their body type and the clothing styles that flatter that body type as well as showing them how to create their own unique fashion statement based on their personality and lifestyle.

These and still further objects will become apparent hereinafter.

These and other features of the present invention are described in more detail in the following detailed description when taken with the drawings. The scope of the invention, however, is limited only by the claims appended hereto.

BRIEF DESCRIPTION OF THE DRAWINGS

Various embodiments of the present invention are described and illustrated herein with reference to the drawings in which like items are indicated by the same reference, in which:

FIG. 2 shows the main menu screen for an electronic fashion shopping system according to the present invention;

FIG. 4 shows the size and fit information menu for the electronic fashion shopping system according to the present invention;

FIG. 5 shows an analysis of fashion suggestions with design do's and don'ts based on the customer's body type according to the present invention.

DETAILED DESCRIPTION OF THE PREFERRED EMBODIMENTS

The computer software system provides an interactive electronic shopping service employing a computer, interactive television, CD-ROM database, the Internet, or other electronic medium or alternatively a manual system. It can also be used as an in-store computer system that allows retailers and manufacturers to provide customers with a personalized shopping experience while freeing sales people. This system is capable of being accessed remotely using typical telecommunication systems. For example, office or home users may connect through analog modems, ISDN, etc. The computer system for electronic fashion shopping can be offered as a service for interactive television services such as the Home Shopping Network, or can be accessed at home using a CD-ROM containing an inventory of fashions to allow off-line shopping. Alternatively, the computer system for electronic fashion shopping can be accessed on the Internet by a customer to allow a fully interactive and up-to-date shopping experience with the ability to transact business, e.g. complete selections and make purchases in a single session. The on-line session also allows inventory checking and sophisticated modeling and rendering to be performed.

Initially the customer inputs information including body measurements and a digital photograph of the customer's face. The retail environments, trained sales associate or personal shopper assists the customer in entering the personal information into the system. For the manual system, data cards are implemented. Alternatively, the customer, without assistance, can fill out a paper or electronic subscription form. An electronic subscription form may be, for example, a computer file uploaded to a central system or an HTML form page transmitted over the Internet. Upon registration, for example, a membership card with a personal code number and a billing code number may be assigned to the customer. The personal identification code may also be transmitted electronically. The personal code number allows the customer to access her personal information and shop using the computer system for electronic fashion shopping. The personal code number identifies the customer, provides security for personal information and allows electronic commerce with reduced risk. The billing code number enables the customer to order merchandise with ease, e.g. eliminates the need to reenter billing information for each transaction.

Figure 1:
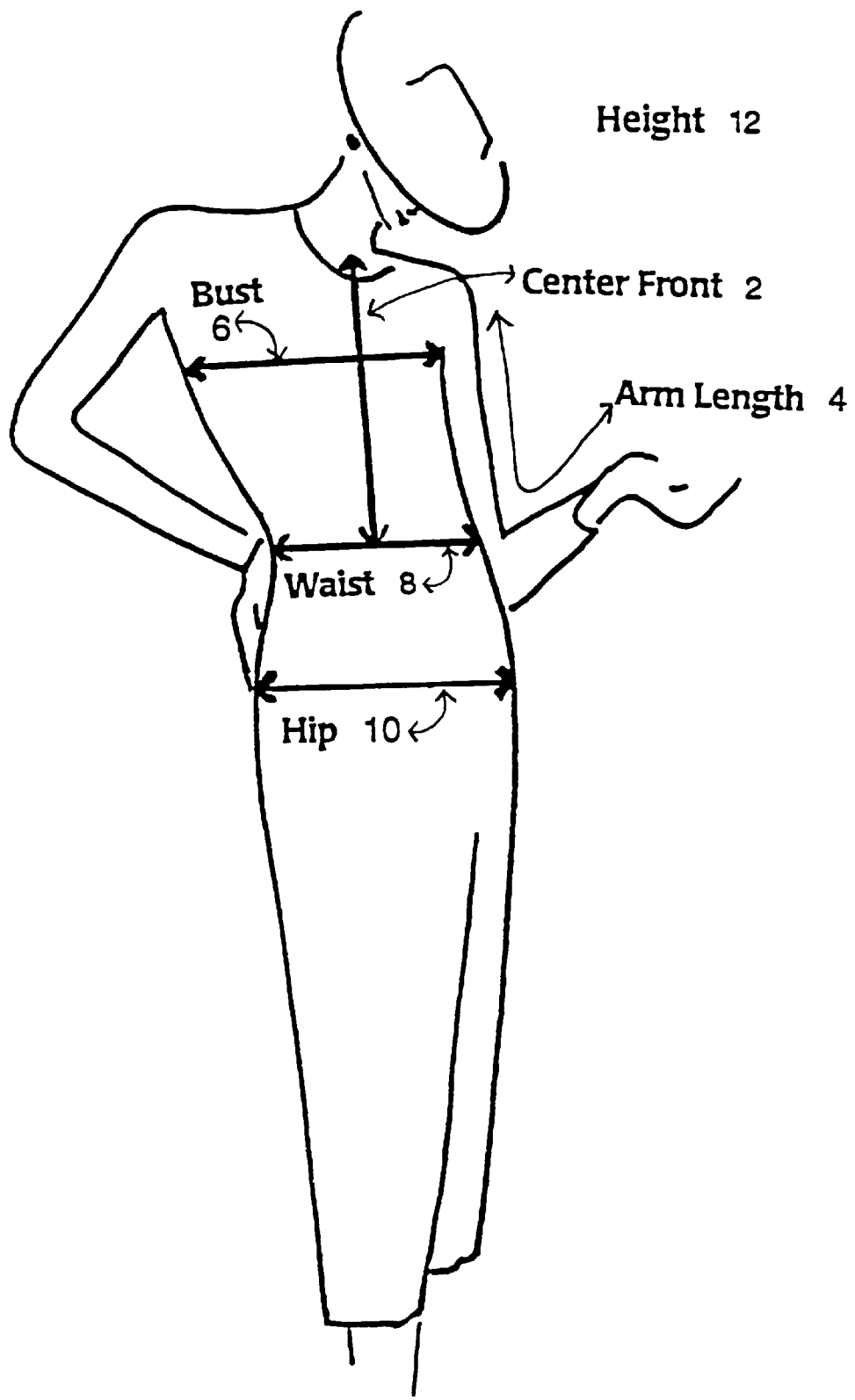
FIG. 1 shows a body frame illustrating the body measurements that must be inputted into the electronic fashion system before accessing the system.

The personal information which is entered into the computer system includes body measurements along with credit information, address, and other pertinent facts. The personal information is a permanent record in the database of the electronic fashion shopping system and redundant input is not needed the next time the customer accesses the system. However, updates or alterations may be made as necessary or desired. Turning to the figures, FIG. 1 shows a body frame illustrating the body measurements that must be inputted into the electronic fashion system before accessing the system. The body measurements include center front 2, arm length 4, bust 6, waist 8, hip 10, and height 12. Center front 2 is measured from the hollow of the neck of the customer to the navel. Arm length 4 is measured from the end of the shoulder to the wrist of the arm. For pants, additional measurements may be necessary which include inseam, center length, and center depth. The customer may also submit a photograph of her face taken with a digital camera or alternatively submit a photograph that is digitized by the electronic fashion shopping service. It is preferable that multiple photographs of the face depicting the front view, side view, back view, etc. are submitted so that the system can accurately depict the face at different angles.

After the personal information is entered, the system determines a body type based on the body measurements. As determined by the system, body type is an individual's skeleton or bone frame plus an amount of flesh surrounding a specific anatomical part. A manual system may employ tables, charts or formulae. Fashion is cloth or fabric constructed to a specific shape and size which determines style. The amount of cloth and shape when cut, is placed on a specific skeletal frame and flesh area, which determines the fashion or look which is the result of the process. Not all shapes fit all frames, so not all styles fit all body types. While certain limitations are physical, e.g. a body too large for the clothing-line, some limitations are aesthetic, and must be determined as a matter of "taste".

Knowing the body type enables the system to automatically allow the customer instant access to all suitable apparel in the. system by fashion category, and further allows a modeled presentation of various clothes. The system for electronic fashion shopping is based on an expert system analysis of the personal information and available garments, and also recommends what shapes best compliment the customer's body type, as well as other fashion recommendations and information by Andrea Rose fashion consulting services® and any other designers. The system thus provides a personalized "chart" characterizing the customer's body type. This chart may be a physical printed document or electronic representation. The chart also has information on the best designs to flatter her specific shape and suggestions on how to dress and shop effectively.

In essence, the computer system acts like a fashion consultant, addressing specific clothing problems, informing the customer her size in the manufacturer's clothes, and determining if there is a fit problem whereby the customer is informed of alterations needed on the garment.

The fashion industry is not standardized on the specific fit for garments, especially for individuals who vary, even slightly, from a manufacturer's ideal for a given size. Thus, a garment of a particular size from one manufacturer will not necessarily fit the same way as garments from another manufacturer, or even from the same manufacturer in a different style. Thus, it is a goal of the present invention to transcend the use of simple sizing codes and perform a complete analysis of the customer's body type with respect to available garments, to model the fit and determine acceptability. Further, in conjunction with the modeling, the system may also determine whether a garment which is a near fit may be efficiently altered to produce an acceptable fit.

The problems for garment fit are generally greater for women than for men or children, due to the larger number of styles for women and more aggressive cuts of fabric.

The system according to the present invention may also include analysis of shrinkage or shape change of a garment over its useful life, in the analysis. Thus, cotton garments which are laundered tend to shrink. Therefore, in determining the characteristics of a garment to be placed in inventory, both the as-new and environmentally cycled states may be determined and stored.

The fashion category for each customer is based on the customer's body measurements and for women the fashion categories are based on anatomical structure. These fashion categories are petite, short (also known as junior), average, and tall. The following chart depicts the height 12 and center front 2 measurements for each fashion category:

|  | Height | Center Front |
| --- | --- | --- |
| Petite | 4'6½" to 5'3" | 12¾" to 13½" |
| Short | 5'3" to 5'5" | 13¾" to 14¼" |

-continued

|  | Height | Center Front |
|---|---|---|
| Average | 5'5" to 5'8" | 14¾" to 15½" |
| Tall | 5'9" to 6'2" | 16½" to 17¼" |

Since these categories are generally recognized, they form a starting point for the analysis, although the present invention is not so limited.

Note that if the center front 2 is 1" or less than the standard set forth above, the person is short waisted. If the center front 2 is 1" or more than the standard set forth above, then the person is long waisted. Additional information may be outputted by the system regarding short waisted and long waisted customers.

These fashion categories, (i.e. petite, short, average, and tall) are translated from the American Fashion Industries categories which are petite, junior petite, missy, junior, large, and halfsize. These categories can also be used for children and men. Alternatively, for men, the fashion categories are slim, athletic, stout, and portly stout. For children, the fashion categories are infant, toddler, children, pre-teen, and teen.

Each of the fashion categories are used in conjunction with a body type. For example, the petite woman can be one of four different body types, which include the full-bust/slight hip stature, normal.stature, without a waistline stature, and slight bust/fuller hip stature. The petite woman has a height between 46 ½ inches and 54 inches. The center front 2 is between 12 ¾ and 13 ½ inches and the arm length 4 is between 20 ½ and 22 ½ inches for petites. The following charts are an example listing of bust, waist, and hip measurements in inches for the extra-small (X-Small), small, medium, large, and extra-large (X-Large) and extra-extra-large (XX-Large) frame petite woman which the computer system contains in its body type database. The extra-small is typically size 2–4, small is typically size 6–8, medium is typically size 10–12, large is typically size 12–14, extra-large is typically size 16–18, extra-extra-large is typically size 20–24, and queen is typically size 1x–4x.

| Petite Normal Stature: | | | |
|---|---|---|---|
| Bust | Waist | Hip | Center Front |
| X-Small 29 to 30 | 19 to 21 | 30 to 31 | 12¼ to 12¾ |
| Small 31 to 32 | 21 to 23 | 32 to 33 | 12¾ to 13¼ |
| Medium 33 to 34 | 23 to 25 | 34 to 35½ | 13¼ to 13¾ |
| Large 36 to 38 | 26½ to 29 | 37½ to 39 | 13¾ to 14¼ |
| X-Large 39 to 41 | 29½ to 32 | 40 to 42½ | 14¼ to 14¾ |
| XX-Large 43 to 45¼ | 33½ to 36 | 44 to 46½ | 14¾ to 15 |

| Petite Slight Bust/Fuller Hip Stature: | | | |
|---|---|---|---|
| Bust | Waist | Hip | Center Front |
| X-Small 27½ to 29 | 19½ to 21 | 31½ to 33 | 12 to 12½ |
| Small 29½ to 31 | 21½ to 23 | 33½ to 35 | 12½ to 13 |
| Medium 32 to 33½ | 23½ to 25 | 36 to 37½ | 13 to 13½ |
| Large 35½ to 37½ | 27 to 28½ | 39 to 41½ | 13½ to 14 |

| Petite Slight Bust/Fuller Hip Stature: | | | |
|---|---|---|---|
| Bust | Waist | Hip | Center Front |
| X-Large 38 to 39½ | 30 to 31½ | 44 to 47 | 14 to 14½ |
| XX-Large 41 to 42½ | 33 to 34½ | 48 to 50½ | 14½ to 15 |

| Petite Full Bust/Slight Hip stature: | | | |
|---|---|---|---|
| Bust | Waist | Hip | Center Front |
| X-Small 29 to 31 | 17½ to 18½ | 27 to 28½ | 12½ to 13 |
| Small 31 to 33 | 19½ to 20½ | 29½ to 31 | 13 to 13½ |
| Medium 33 to 35½ | 21 to 22½ | 32 to 33 | 13½ to 14 |
| Large 37 to 39½ | 25 to 26½ | 35½ to 37 | 14 to 14½ |
| X-Large 41 to 43½ | 28½ to 31 | 38½ to 40½ | 14½ to 15 |
| XX-Large 45 to 48 | 31½ to 34½ | 42½ to 44½ | 15 to 15½ |

| Petite without Waistline Stature: | | | |
|---|---|---|---|
| Bust | Waist | Hip | Center Front |
| X-Small 29 to 30 | 21½ to 23 | 30½ to 32 | 12 to 12½ |
| Small 31 to 32 | 23½ to 25 | 32½ to 34 | 12½ to 13 |
| Medium 33 to 34 | 25½ to 27½ | 34½ to 37 | 13 to 13½ |
| Large 36 to 38 | 29 to 32 | 38 to 40 | 13½ to 14 |
| X-Large 39 to 41½ | 33 to 35½ | 41 to 44 | 14 to 14½ |
| XX-Large 42 to 44½ | 36 to 38½ | 44 to 46 | 14½ to 15 |

Note that there are corresponding charts for the short, average, and tall fashion categories.

FIG. 2 shows the main menu of a preferred embodiment of the electronic fashion shopping system. A main menu computer interface screen requests that the customer select an area in which she would like to shop. The customer selects a clothes items to scan, which include day suits 14, evening suits 16, day dresses 18, robes, coats 20, active sports 22, sportswear 24, casual wear and at-homewear 26 or any other fashion category. The preferred system is implemented as a typical graphical interface under Microsoft Windows software and Windows 95 software, although other operating systems and interface may be used. Selection is made using a touch screen computer monitor, mouse, or keyboard.

In an interactive television environment, an infrared remote control device is employed to interact and communicate with the system. The system, after reviewing a selection, may also access other related information for analysis and presentation. For example, accessories may be available for some clothes items, such as day suits and evening suits. In addition, shoes are also capable of being selected. When shoe shopping, basic shades that coordinate with the clothing, black, or another neutral are selected.

Figure 3:
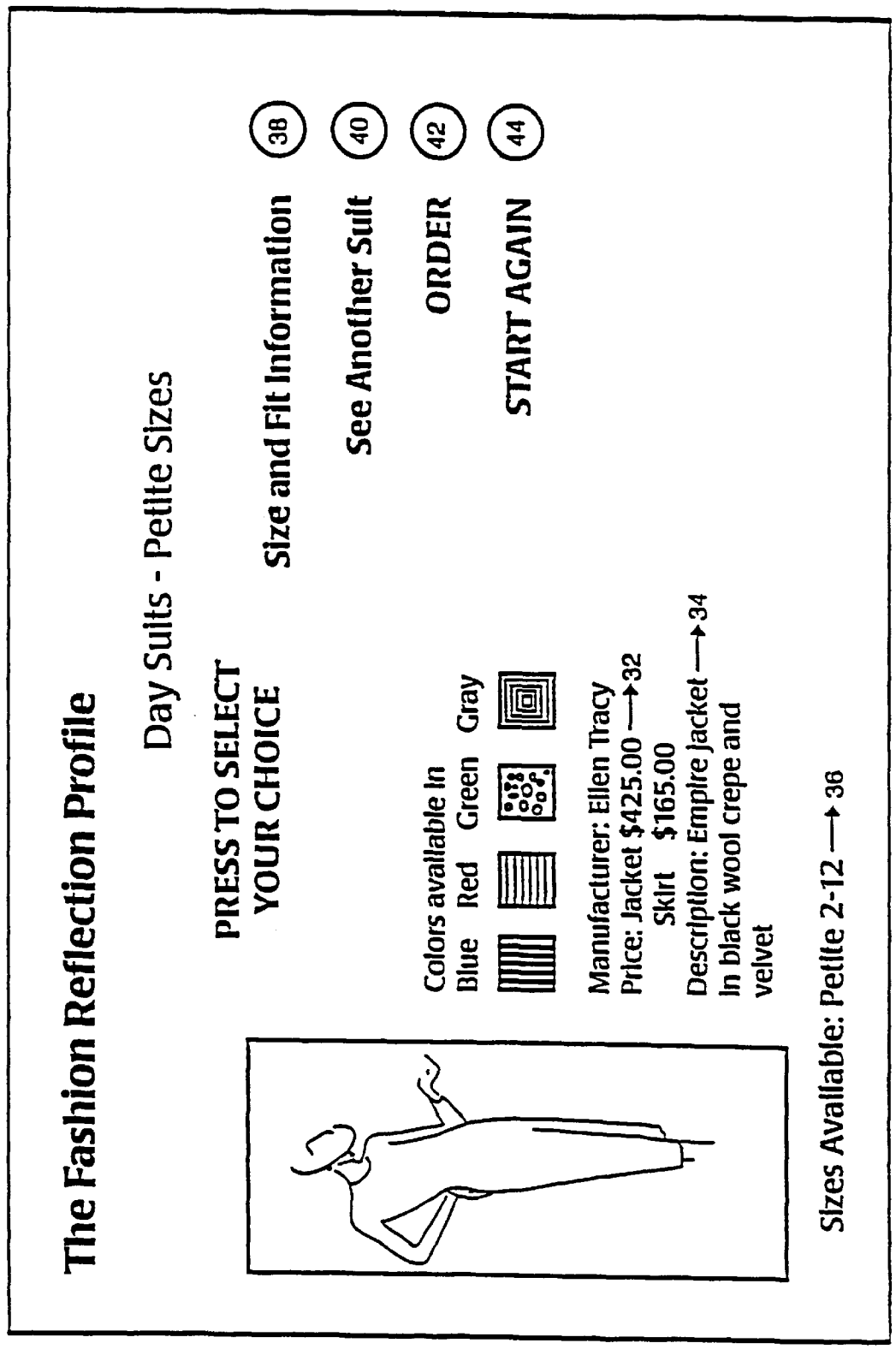
FIG. 3 is a submenu that depicts the fashion data for a selected fashion for the electronic fashion shopping system according to the present invention.

Each clothes item references portions of a database of fashions for each fashion category. As FIG. 3 illustrates, a submenu allows selection of a fashion for each category. For example, if day suits was selected by the customer, then the first entry of the database of fashions for daysuits in a fashion category such as petites would be shown. The system may also provide an adaptive presentation of choices based on a determined prioritization. Each database entry or fashion has corresponding fashion data. Fashion data allows presentation of a projection of a model having the customer's body type wearing the selected fashion, portrayed on the computer screen. A manual presentation is also possible through modular graphic elements. The face of the model is the digitized photograph or photographs submitted by the customer as personal information. Where such a photograph is unavailable, the customer may select a suitable face model from a plurality of face models, for use in the presentation. This allows the customer the opportunity to preview visually how she would look in a specific style, without having to try it on. The model may be a two dimensional projection, or include three dimensional surface mapping allowing rotations or animations. Other fashion data include the available colors of the fashion 28, the manufacturer 30, price of the fashion 32, the description 34, and sizes available 36. If accessories are included, the style number, description, and cost of the accessory are included as fashion data.

The submenu allows the customer to select the size and fit information menu 38, see another garment in the database for the selected clothes item 40, order 42, or start again 44, by selecting an indicator.

FIG. 4 shows the size and fit information menu for the electronic fashion shopping system. For each fashion, there is corresponding size and fit information menu that the customer can select to view by selecting the "Size and Fit Information" push button or icon. The system compares the customer's body measurements with the garment manufacturer's sizing chart or the actual measurements of the garment. The system uses the universal grading system and sloper concept. All sizes are derived from the sloper. Different manufacturers have a different sloper. For example, starting at size 10, for every next size, one inch is added to each side of the fabric. The computer system or manual system takes into account this size differential. After size 12, it is possible that 1 ½ inches is added to each side of the fabric and after size 16 is reached 2 inches is added to each side of the fabric.

Based on the individual's body measurements, originally gathered as personal information, the correct garment size is calculated and correctly presented. Thus, for example, a customer may be a size 6 in an Ellen Tracy dress and a size 12 in a Tahari dress. As a result, this eliminates the need to guess what size the customer is, and the necessity of trying on of several different sizes for a given manufacturer to determine which size is the right size for the selected clothes item. This is dependent upon the measurements of the customer. In an automated system, the computer tells the correct size for a manufacturer so that the customer need only bring in one size to the dressing room rather than several different sizes of the same garment, or take it home knowing her size without trying it on. The closest size is outputted to the computer screen or printer. For the size and fit submenu, the computer system will generate a virtual mannequin 46 of the customer's body including a digitized photograph of her face which shows the customer how her selected fashion will fit and look. The system may also generate a pointer or arrow 48 which indicates where alterations need to be performed and specifies how much alteration a selected fashion needs. The amount that is required to be adjusted is listed in inches, but can also be listed using the metric system.

Alternately, the required alterations may be stored by the computer system and employed in an automated or semi-automated tailoring system. Thus, once the alterations are determined, they need not be manually transmitted to a tailor for implementation. In addition, the system may include a so-called feedback system, wherein a consumer tries on a selected garment and a test garment to determine whether the fit and fashion are appropriate, giving feedback to the computer, which modifies its future analyses based on the feedback. For example, one or more test garments may be tried on, which allow generalization to a larger set of actual garments. In another embodiment, an electronic imaging system views the customer in selected garments or test garments, to obtain further personal information about body size and shape.

In the submenu shown in FIG. 3, other fashion data such as manufacturer, price, and description are also indicated. Since the customer now knows her correct size in the manufacturer's garment, and the necessary alterations that are needed, if any, it is more likely that the customer would be satisfied with her purchase and less likely that a return would be necessary. The customer's body measurements may also be listed on the computer screen. The customer also has the options to See another suit 40, ORDER 42, or START AGAIN 44, from the Size and Fit Information Menu.

To see another fashion in the current database of fashions for the selected clothes item, the customer selects the "See another suit" icon on the computer screen. Then, another database entry and corresponding fashion data will be displayed.

To order, the customer selects the ORDER submenu. This menu enables the customer to place an order by computer, to telephone an order, or to send an order by facsimile. Where the electronic commerce system is implemented, each transaction is charged to the customer's account and then mailed or shipped to the customer. Of course, the customer may also pick up the garment at a retail location. The billing code is entered and this generates the appropriate name, shipping address, billing address, and other pertinent information. The style number, cost, size, and color are also entered or are automatically provided for a selected fashion. For in-store situations, the sales associates can have an item ready for try-on, or wrapped and ready to go. An automated storage and retrieval system, as employed in the dry-cleaning industry, may be used to retrieve selected inventory.

To start again, the customer selects the START AGAIN icon, and the customer can then select another clothes item such as day suits, evening suits, dresses, robes, coats, active sports, sportswear, casual wear, and at-home wear.

The system optionally has a fashion reflection submenu which outputs the customer's body type to the computer screen, suggests fashion shapes for the determined body type, and suggests fashion shapes to avoid wearing. This information can be printed on an attached printer or downloaded to diskette for printing at a later time.

Turning now to FIG. 5, this shows analysis of fashion suggestions with designer do's and don'ts based on the customer's body type. The system will output suggestion fashion shapes for the customer's unique body type 50 and suggested fashion shapes to avoid wearing 52. After body type is determined, the system can output in a chart format fashion do's and don'ts. Using the petite fashion category as an example, the system will output that boleros, cropped jackets and short, tailored jackets with small lapels and collars would work very well. In this case, the system also states that a petite should avoid long skirts, since the extra length will make the petite look smaller, and long garments cut the body and give the appearance of being shorter. The system will also output that when selecting prints, smaller is better since larger patterns tend to be overwhelming and will be proportionately awkward for the petite body. Vertical stripes are a good choice as they create the illusion of height. It is better to go with skinny stripes rather than bold stripes which run the risk of overpowering the petite woman. The system would also output that when accessorizing, it is important to avoid oversize pieces, and instead select narrow belts, scarves that are not too wide and smaller, more delicate jewelry.

For the normal petite, the following information would be outputted to the computer screen or be provided on a data card if the manual system is being employed:

Do wear

Pleated and dirndl skirts will aid volume to your waist and hips, which will add shape to your thin frame.

Peplums are another great look that creates shape and volume for your form.

Blouses worn with bolero vests are also flattering to your figure.

Don't Wear

Avoid large ruffles since they will overpower you with too much fabric.

Large shoulder pads will throw your body out of proportion.

Layers will make you appear smaller.

For the petite with a small bust and large hips, the following information would be outputted to the computer screen or be provided on a data card if the manual system is being employed:

Do Wear

A-line skirts and dresses create the illusion of an evenly proportioned body.

Jackets that are five to seven inches below the waist will camouflage the size difference between your top and bottom and create a better proportion.

Shop for separates. This will eliminate the need for alternations that a one-size, two piece outfit may require.

Don't Wear

Stay away from pleated skirts which will accent the fullness of your hips.

Avoid full dirndl skirts with gathering at the waist as it will emphasize that area.

Steer clear of tight skirts that will call attention to the disproportionate size difference between your bust and hips.

For the petite with a large bust and small hips, the following information would be outputted to the computer screen or be provided on a data card if the manual system is being employed:

Do Wear

Jackets that fall four to seven inches look great. This style will camouflage the size difference and create a better proportioned figure.

Vests that fall four to seven inches below the waist create a more even proportion for your figure.

Dark color tops will make your bust look smaller.

Don't Wear

Avoid blousons (a full blouse that usually has elastic at the bottom and goes to the hips) this style brings extra volume to the top that is not needed.

Stay away from white on the top and black on the bottom. White gives the illusion of looking bigger, while black gives the illusion of looking smaller, the combination will emphasize the difference.

Horizontal stripes in a shirt will make your top appear larger.

For the petite with a center front 2 that is short waisted, the following information would be outputted to the computer screen or be provided on a data card if the manual system is being employed:

Do wear

Jackets that fall four to seven inches below the waist elongate the midsection.

A-line and straight dresses will camouflage the torso.

Out blouses that fall at least four inches below the waist help even the look by disguising the waist.

Don't Wear

Try to avoid belts; they will draw attention to your short waist.

Cropped vests and short jackets emphasize the waist and make you look more short waisted.

Fitted two-piece suits that have a different color top and bottom should not be worn. The color contrast will accent the difference between your upper and lower length.

For the petite with a center front 2 that is long waisted, the following information would be outputted to the computer screen or be provided on a data card if the manual system is being employed:

Do wear

Jackets that fall three to seven inches below the waist look best. These styles even the proportion.

Form-fitting, A-line dresses draw attention away from the long waist.

One color, two-piece sets tend to bring a more even look to the torso.

Don't Wear

Avoid bolero or cropped jackets, since they will emphasize the length of your center front.

Hip-huggers will make a long torso look longer.

Try not to wear belts which call attention to the waist and show the difference in proportion.

This information is meant to be illustrative and not limiting. Additional or alternative information may be presented.

Figure 6:
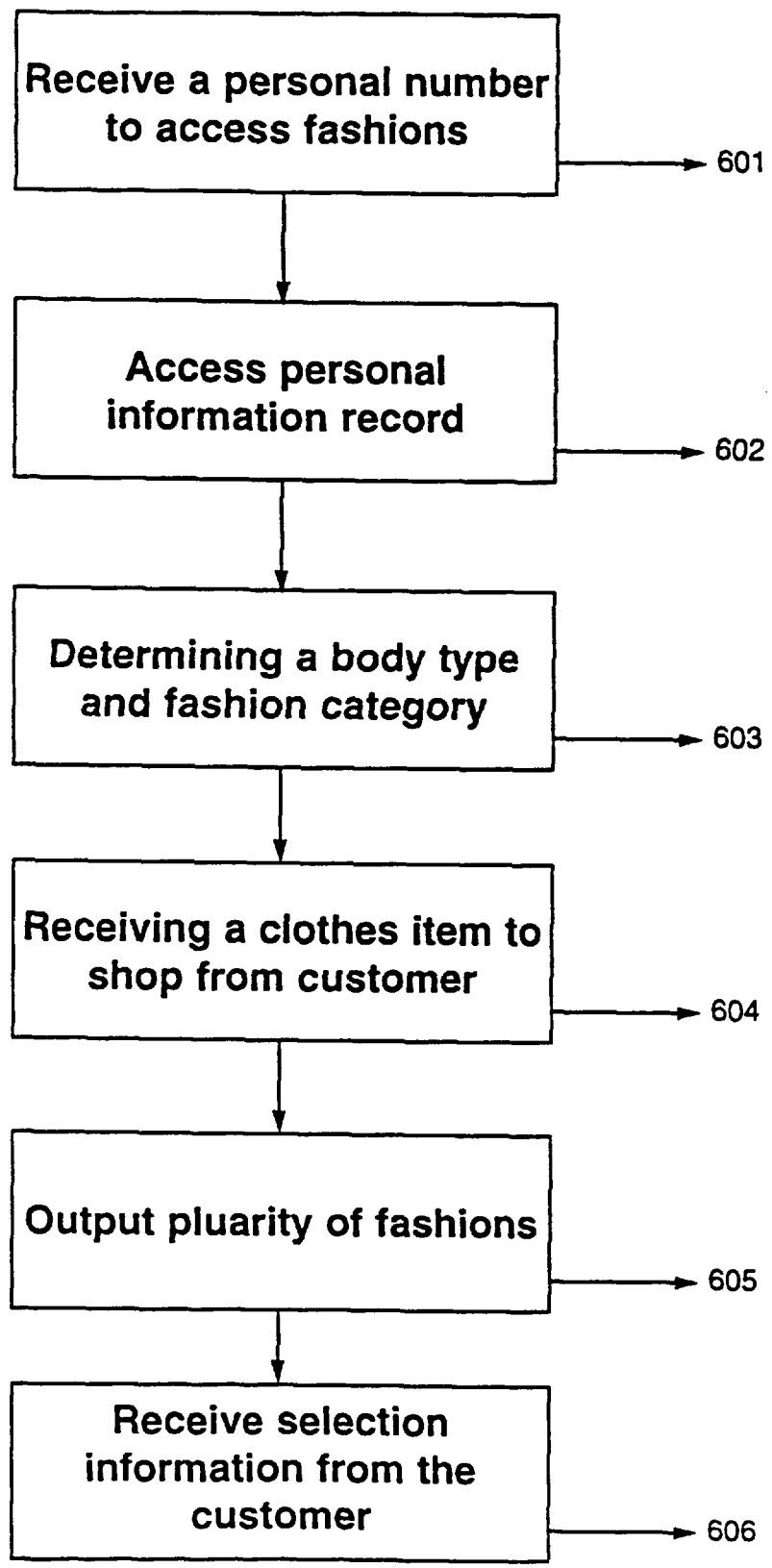
FIG. 6 is a flowchart illustrating the method of electronic fashion shopping.

Turning now to FIG. 6, this is a flowchart of a method of electronic fashion shopping for one embodiment of the present invention. At step 601, the system receives a personal code number to access a database of fashions. The personal code number is linked to personal information relating to the customer. A personal information record is accessed 602 based on the inputted personal code number. At step 603, a body type and fashion category is determined based on the personal information occurs. Optionally, data relating to a body type and body type may be output based on the personal information record. Next, at step 604, a clothes item to shop from the customer is received. Optionally, the system selects fashions from the clothes items based on the body type and fashion category. At step 605, the system outputs a plurality of fashion data based on the selected fashions. Optionally, the system suggests body shapes and intended body type tips. Finally at step 606, the system receives selection information from the customer The computer system for electronic fashion shopping allows easy inventory control since merchandise photographs can be changed at any time by updating the database records and the system keeps track of what is in stock, what sizes are available and what needs to be ordered. The system may also include information as to when out-of-stock items will be in the store. The inventory control may be integrated with an automated storage and retrieval system making inventory more space efficient.

The system provides better customer service since it personalizes and simplifies the shopping process. The system allows customers to consider more clothes that would fit in less time, presenting the customer with more buying opportunities, and thus increases efficiency of the system as compared to traditional shopping methods.

The computer system has application for a retailer and manufacturer selling their products on the computer, CD-ROM, the Internet, or television or through manual systems. The system also has application for a manufacturer selling his product direct, a catalog company, a fashion designer marketing their line, or an on-line network selling their own products. The computer system would aid in the success of interactive on-line home shopping by offering the home shopper what is traditionally considered as only in store services.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined by the appended claims.

What is claimed is:

1. A method of fashion shopping by a customer comprising the steps of:
   receiving personal information from the customer;
   selecting a body type and fashion category based on the personal information;
   selecting fashions from a plurality of clothes items based on the body type and fashion category;
   outputting a plurality of fashion data based on the selected fashions;
   receiving selection information from the customer; and
   processing order information to place an order for the selected fashions.

2. A method as in claim 1 wherein the personal information includes a digitized image of the customer's face.

3. A method as in claim 1 wherein the personal information includes an electronic commerce identifier for billing purposes.

4. A method as in claim 1 wherein the fashion category provided is selected from the group consisting of petite, short, average, and tall.

5. A method as in claim 1 wherein said clothes items are a clothes category selected from the group consisting of day suits, evening suits, dresses, robes, coats, active sports, sportswear, casual wear, and at home wear.

6. A method as in claim 1 wherein said fashion data comprises providing available colors, manufacturer's prices, styles, and sizes.

7. A method as in claim 1 further comprising the step of determining on availability of selected fashions.

8. A method as in claim 1 wherein the method further comprises the step of receiving an order from the customer.

9. A method as in claim 1 further comprising the step of outputting a personal code number to identify the customer.

10. A method as in claim 1 wherein body type is a stature selected from the group consisting of full-bust/slight hip, normal, without a waistline, and slight bust/fuller hip.

11. A method as in claim 1 wherein the fashion category is selected from the group consisting of slim, athletic, stout, and portly stout.

12. A method as in claim 1 wherein the fashion category is selected from the group consisting of infant, toddler, children, pre-teen, and teen.

13. A method as in claim 1 wherein the fashions and fashion data are contained in a database.

14. A method as in claim 1 wherein the fashion data includes a garment description.

15. A method as in claim 1 wherein the fashion data includes accessory style number, accessory description, and accessory cost.

16. A method as in claim 1 further comprising the step of updating the selected fashions based on said received selection information.

17. A method as in claim 1 wherein the personal information includes the measurements of bust, hips, waist, arm length, height, and center front.

18. A method as in claim 17 wherein the measurements further comprise inseam, center length, and center depth.

19. A method as in claim 1 wherein the personal information includes a plurality of body measurements and a digitized picture of the customer's face.

20. A method as in claim 19 wherein the outputting the plurality of fashion data includes outputting a computerized simulated body type image corresponding to the customer's body measurements and the digitized picture of the customer's face.

21. A method as in claim 1 further comprising the step of determining size and fit of a selected fashion.

22. A method as in claim 21 wherein determining the size and fit comprises the steps of displaying a closest size for the selected fashion and indicating where adjustments are necessary.

23. A method as in claim 21 further comprising determining an amount the selected fashion needs to be altered.

24. A method of electronic fashion shopping by a customer using an electronic medium comprising the steps of:
   receiving a personal code number to access a database of fashions;
   accessing a personal information record based on the inputted personal code number;
   outputting a body type and body type data based on the personal information record;
   receiving a clothes item to shop from the customer;
   receiving selection information from the customer; and
   outputting an order for the clothes item, an invoice for the customer and an inventory record of all items ordered by the customer.

25. A method as in claim 24 wherein receiving selection information from the customer is a step selected from the group consisting of placing an order, see another fashion, start again and see size and fit information.

26. A method as in claim 24 wherein the personal information record includes a digitized image of the customer's face.

27. A method as in claim 24 wherein the personal information record includes electronic commerce information for business purposes.

28. A method as in claim 24 wherein the clothes item is a clothing category selected from the group consisting of day suits, evening suits, dresses, robes, coats, active sports, sportswear, casual wear, and at-home wear.

29. A method as in claim 24 wherein the body type data is associated with data relating to which styles to wear and which styles to avoid.

30. A method as in claim 24 wherein the body type is a stature selected from the group consisting of full-bust/slight hip, normal, without a waistline, and slight bust/fuller hip.

31. A method as in claim 24 wherein the fashion data comprises providing available colors, manufacturer's prices, styles, and sizes.

32. A method as in claim 24 wherein the method further comprises the step of receiving an order from the customer.

33. A method as in claim 24 wherein the fashion data includes a garment description.

34. A method as in claim 24 further comprising the step of updating the selected fashions based on the received selection information.

35. A method as in claim 24 wherein the personal information record contains a plurality of body measurements for the customer.

36. A method as in claim 35 wherein the body measurements include bust, hips, waist, arm length, height, and center front.

37. A method as in claim 24 further including the step of determining a fashion category based on the personal information record.

38. A method as in claim 37 wherein the fashion category is selected from the group consisting of petite, short, average, and tall.

39. A method as in claim 37 wherein the fashion category is selected from the group consisting of slim, athletic, stout, and portly stout.

40. A method as in claim 37 wherein the fashion category is selected from the group consisting of infant, toddler, children, pre-teen, and teen.

41. A method as in claim 24 further comprising the step of determining size and fit of a selected fashion.

42. A method as in claim 41 wherein determining the size and fit comprises the steps of displaying a closest size for the selected fashion and indicating where adjustments are necessary.

43. A method as in claim 41 further comprising determining the amount the selected fashion needs to be altered.

44. A method as in claim 41 further comprising the step of determining an availability of selected fashions.

45. A method for assisting in clothing shopping comprising:

receiving personal information from a person including a plurality of body measurements;

providing a database of clothing items, including multi-dimensional models of fit for the clothing items;

receiving a clothing type from the person;

selecting a clothing item of the clothing type from the database, the clothing item fit model of the selected clothing item, corresponding to the body type as determined by the received body measurements; and outputting data relating to the result of modeling the person in the selected clothes item based on the personal information and the selected clothing item fit model.

* * * * *

UNITED STATES PATENT AND TRADEMARK OFFICE
CERTIFICATE OF CORRECTION

PATENT NO : 5,930,769
DATED : July 27, 1999
INVENTOR(S) : Andrea Rose

It is certified that error appears in the above-identified patent and that said Letters Patent is hereby corrected as shown below:

Cover page, item 76, Inventor, "Rose" should be --Rosengard--.

Figure 6, box 605, "pluarity" should be -- plurality --

Col. 1, line 45, "instock" should be -- in-stock. --.

Col. 4, line 12, "the." should be -- the --;

line 27, "customer" should be -- customer of --.

Col. 5, line 28, "normal.stature," should be -- normal stature, --.

Col. 7, line 30, "is" should be -- is a --.

Col. 10, line 56, "occurs." should be -- record. --.

Claim 7, col. 11, line 60, "on" should be  an --.

UNITED STATES PATENT AND TRADEMARK OFFICE
CERTIFICATE OF CORRECTION

PATENT NO : 5,930,769
DATED : July 27, 1999
INVENTOR(S) : Andrea Rose

It is certified that error appears in the above-identified patent and that said Letters Patent is hereby corrected as shown below:

Column 4, line 18, "Rose" should be -- Rose® --;

line 19, "services®" should be -- services --.

Signed and Sealed this

Fourth Day of July, 2000

Attest:

Q. TODD DICKINSON

Attesting Officer

Director of Patents and Trademarks